United States Patent [19]

Eisermann

[11] Patent Number: 5,264,685
[45] Date of Patent: Nov. 23, 1993

[54] CODING DEVICE FOR MAGNETIC CARDS

[75] Inventor: Armin Eisermann, Velbert, Fed. Rep. of Germany

[73] Assignee: Schulte-Schlagbaum Aktiengesellschaft, Velbert, Fed. Rep. of Germany

[21] Appl. No.: 623,950

[22] PCT Filed: Jun. 9, 1989

[86] PCT No.: PCT/EP89/00649
§ 371 Date: Dec. 7, 1990
§ 102(e) Date: Dec. 7, 1990

[87] PCT Pub. No.: WO89/12282
PCT Pub. Date: Dec. 14, 1989

[30] Foreign Application Priority Data

Jun. 11, 1988 [DE] Fed. Rep. of Germany ....... 3819909

[51] Int. Cl.$^5$ .............................................. G06K 7/01
[52] U.S. Cl. .................................. 235/382.5; 235/449;
235/475; 346/74.5; 360/125
[58] Field of Search ...................... 235/382.5, 475, 449;
360/123, 125; 346/74.2, 74.5, 155

[56] References Cited

U.S. PATENT DOCUMENTS

| 2,675,429 | 4/1954 | Rohling | 360/125 |
| 3,890,623 | 6/1975 | Schmid et al. | 346/74.5 |
| 3,984,660 | 10/1976 | Oka et al. | |
| 4,110,803 | 8/1978 | Townsend | 235/449 |
| 4,128,851 | 12/1978 | Sedley | 360/4 |
| 4,150,781 | 4/1979 | Silverman et al. | 235/382 |
| 4,526,264 | 7/1985 | MacNawara et al. | |
| 4,607,155 | 8/1986 | Nao et al. | 235/379 |
| 4,727,975 | 3/1988 | Eisermann | 235/382.5 |
| 4,825,059 | 4/1989 | Kurihara et al. | 235/485 |
| 4,861,974 | 8/1989 | Kondo et al. | 235/475 |
| 4,866,661 | 9/1989 | de Prins | 235/382 |

FOREIGN PATENT DOCUMENTS 0164630 12/1985 European Pat. Off. .
1050375 2/1959 Fed. Rep. of Germany .
2851713 10/1980 Fed. Rep. of Germany .
2228253 11/1974 France .

Primary Examiner—Eugene R. LaRoche
Assistant Examiner—Christopher R. Glenbocki
Attorney, Agent, or Firm—Martin A. Farber

[57] ABSTRACT

A device for coding key cards for magnetically operating locks and the incorporating of such a device which is as simple as possible plus the corresponding key cards in an entrance control system. The key card has, in addition to the locking code, a second identity coding, both of the codings being produced, insofar as possible, in a single passage through the device.

2 Claims, 11 Drawing Sheets

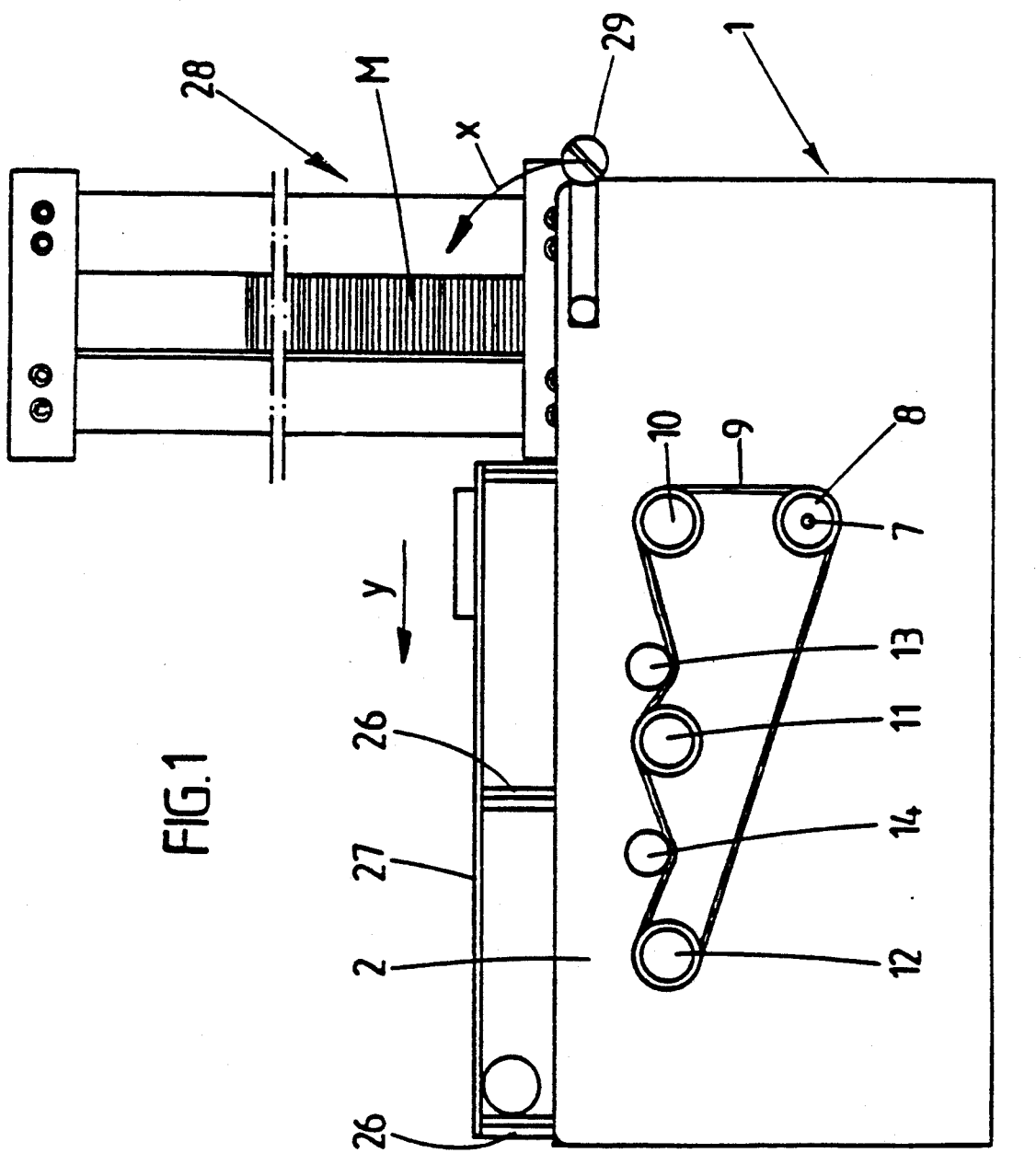
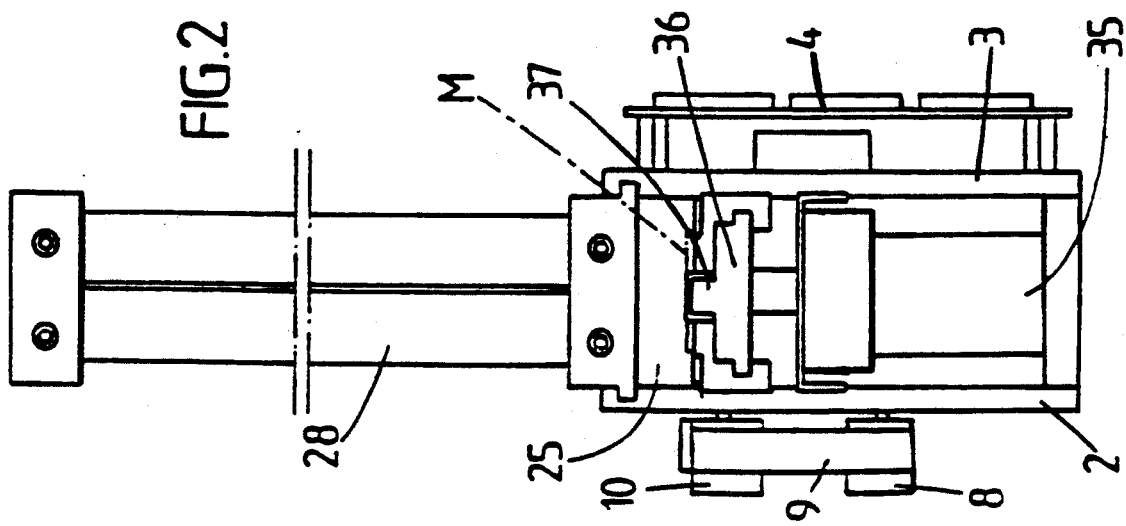

MB

CODING DEVICE FOR MAGNETIC CARDS

FIELD AND BACKGROUND OF THE INVENTION

The present invention relates to a coding device for magnetic cards, having at least one magnetizing device which comes against the surface of the card to be magnetized, said device having a magnetizing pin and excitation coil surrounding it as well as an electric control device for the magnet coil.

Such a coding device is known in the form of a hand-held instrument (Federal Republic of Germany OS 28 51 713). The pointwise magnetization of the magnetic card requires a perforated template so that the magnetization pin is passed through the holes which determine the arrangement of the coding. The control device is then actuated, the excitation coil provided with current, and the magnetization pin produces the corresponding point of magnetization on the magnetic card. This development has the disadvantage of the large amount of labor required for the coding of the magnetic card. This must be done very carefully so that the magnetized regions are not produced at the wrong place. Thus such a coding device is not suitable for automatically operating installations.

SUMMARY OF THE INVENTION

The object of the present invention is so to develop a coding device of the type in question that is of simple construction in such a manner that coding of the magnetic card is possible within a short time. The coding furthermore should also be adapted to be carried out automatically.

This object is achieved in a coding device of this type in the manner that the magnetization pin is arranged on a wide side of a card passage channel.

As a result of this development, there is created a coding device of the type in question by means of which coding can be produced within a short time on the magnetic card. The coding of the magnetic cards is now effected continuously. The magnetization time and the preferably constant speed of passage of the card are so adapted to each other that the magnetic card practically scarcely moves during the magnetization in view of the extremely short magnetization time. In practice this takes the form that by means of a magnetization pin which is preferably of circular cross section, circular regions of magnetization are also produced on the magnetic card.

Furthermore, several magnetization regions can be produced on a magnetic card by a single magnetization device, the magnetization regions lying one behind the other on a track. Since the magnetic cards can be coded in a short time (during the passage through the card passage channel), use is possible in entrance control systems such as, for instance, for bath houses. Upon entrance into the bath house and after paying a fee, the visitor is given a correspondingly coded magnetic card by means of which a magnetic lock provided on a locker door can be actuated. Upon leaving the bath house, the magnetic card is then taken back and then, after the erasing of the code, to be provided with a different code and be issued again. The coding can be effected automatically, i.e., on the one hand in the continuous passage process and on the other hand under computer control.

One advantageous further development consists in providing a plurality of magnetization devices the magnetization pins of which lie on channel longitudinal tracks arranged spaced apart from each other on the longitudinal edge of the card passage channel. In this way, the coding regions can be produced in accordance with a system pattern. Despite the production of a large number of magnetization points, the speed of passage of the magnetic cards need not be reduced.

In this connection, it is advantageous for the magnetization pins to lie staggered with respect to each other in the longitudinal direction of the track. By this measure, no special consideration need be taken of the structural shape of the magnetization devices. Despite track lines which lie close to each other and permit a fine system grid, it is not necessary to use particularly thin magnetization pins or coils. The staggered arrangement in the track longitudinal direction always makes it possible for the magnetization pins of the magnetization devices to be at a sufficiently large distance from each other. Furthermore, in this way, using a fixed system grid, assurance can also be had by suitable offset of the magnetization devices that two magnetizations never take place simultaneously during the passage. Rather the magnetization takes place laterally offset. Interaction between magnetic fields is thereby excluded.

In order to obtain strong magnetization regions, the end surface of each magnetization pin extends into the card passage channel, and the pin is longitudinally displaceable under initial spring tension within a channel transverse hole. Therefore during the magnetization of the magnetic card the magnetization pins can extend up to the wide surface of said card so that all air gaps are avoided.

One optimal solution in this respect consists therein that a run-on bevel is arranged in front of the end surface of the magnetization pin. The magnetic card can then still exercise a control function on the magnetization pin so that the latter definitely sits on the wide surface of the magnetic card during the passage. If the magnetization pin has a circular cross-section, then the run-on bevel is developed in the form of a frustoconical surface.

In order for easy control to be possible despite the fact that the magnetization pin extends into the card passage channel, each magnetization pin has a step which limits its path of entrance into the card passage channel and cooperates with a corresponding mating shoulder in the channel transverse hole.

Advantages with respect to technique of magnetization are obtained in the manner that the other wide side of the card passage channel is formed by a channel wall which consists of ferromagnetic material.

Upon use of the coding device in entrance control systems, it is advisable to provide a card-stacking magazine in the region of the starting point of the channel. The closeness of the card-stacking magazine to the card passage channel greatly favors rapid coding of the magnetic cards.

This is furthermore contributed to by the fact that a pusher which moves the lowermost card of the stack of cards into the card passage channel is provided. In this way, the magnetic card is moved up to a conveyor device of the card passage channel, which device then assures the further transport of the magnetic card.

Good conveyance is obtained in this connection by a plurality of pairs of transport rollers which extend over the wide sides of the card passage channel, adjacent pairs of transport rollers being at a shorter distance from each other than the length of the magnetic card. Therefore, upon its passage, the magnetic card is gripped by at least one pair of transport rollers so that disturbances in passage are substantially avoided. It is clear that the pairs of transport rollers are driven in synchronism and are so shaped that the magnetic card is conveyed with constant speed through the card passage channel.

In order that the magnetization points or regions are precisely associated with the magnetic card, a light barrier which is present in the starting region of the channel and scans the narrow edge of the magnetic card is provided, as well as a cyclic motor which drives the pairs of transport rollers and is equipped with an angle-measurement transmitter. As soon as the narrow edge of the magnetic card is noted by the light barrier, the electronic system receives a corresponding pulse. The rotation of the motor is reported to the electronic system by means of the angle-of-rotation measurement transmitter and verified by the latter. During the further passage of the card, the electronic system at all times knows the instantaneous position of the card so that a magnetic region is produced on the magnetic card at the proper time and thus also at the proper place by excitation of the corresponding magnetization device.

For the event, nevertheless, that asynchronism arises, further light barriers are provided for the resynchronization in the manner that another light barrier is provided for the resynchronization behind each pair of transport rolls, seen in the direction of passage of the card.

In order to verify the removal of the coded magnetic card, a final light barrier, located in the region of the end of the channel, which notes the pulling of the magnetic card out of the card passage channel is provided.

The possible uses of the coding device are increased by a bar-code reader, associated with the card passage channel, for a bar code which is arranged on the wide side of the magnetic card. While the magnetic code forms a closing function, the bar code has an organizing character. In this way, for instance, timing can be effected and if additional services within an installation are used, an additional charge can be calculated, or the freeing of a locker, etc. can be made known to a central computer.

One embodiment of the invention is characterized by a plurality of lockers located in the entrance control region and adapted to be actuated by the corresponding magnetic code of the magnetic cards, and by an entrance barrier of a magnetic-card issuing machine which opens upon the delivery of a card or is adapted to be opened by the card which is issued, and by an exit barrier, the automatic magnetic-card issuing machine issuing to the user upon his entrance a magnetic card from the card stacking magazine, said card being coded during the delivery process with the magnetic code of a free locker and having a bar code which can be read by the bar-code reader during the issuing process, the associating of bar code with magnetic code taking place by means of a central computer and the exit barrier having a card insertion slot for evaluation of the bar code of the returned magnetic card.

If the bath house is provided, for instance, with such an entrance control system, this means that, before using the bath house, the visitor must pay an amount of money, whereupon the magnetic card automatic issuing machine issues a newly coded magnetic card and causes the opening of the entrance barrier. The magnetic card issued contains, in addition to the magnetic code, an invariable bar code which is read by the bar-code reader during the passage of the card and therefore during the issuing process. The magnetic code is then associated with the bar code via the central computer in the form of a magnetic coding to be applied to the magnetic card, for instance in the manner that free locker No. 10 is associated with bar code "B", i.e. said card contains the corresponding magnetic coding for the closing of the lock of locker No. 10. The number of the locker can be made known to the visitor either on a display panel or on a voucher which is also issued. With the card bearing the magnetic code and the bar code the visitor can now go to the corresponding locker, place his clothing therein, and actuate the lock of the locker by means of the magnetic card.

The lock can be of such a construction that, after insertion of the magnetic card, magnetic pins are so displaced by the magnetic regions of said card that they leave a perforated plate in the locker lock. Together with the magnetic card, a pusher which bears the magnetic pins can then be displaced, which permits the locking or opening thereupon of the lock. The magnetic card remains with the visitor. By means of the bar code, further automatic services can be utilized within the bathhouse, such as, for instance, entrance to a solarium (opening of the entrance door), the obtaining of beverages, etc. This is made known via an electronic extension station to the central computer of the automatic issuing machine. Upon leaving the bathhouse, the magnetic card is then introduced into the card insertion slot for evaluation of the bar code. The central computer, in this connection, notes that locker No. 10 which is associated with bar code "B" is again free. Locker No. 10 can therefore be issued again. Furthermore, the period of use as well as any services provided are checked. Depending on the services utilized and the length of time that the bathhouse has been used, either the request is made to pay an additional amount of money or the unused amount of money is returned. Only then does the exit barrier open.

For reuse of the cards there is provided a magnetic-code erasing device which erases the magnetic code of the returned magnetic card before said card is fed to the card stacking magazine. A single magnetic card can therefore pass many times through the cycle described above.

BRIEF DESCRIPTION OF THE DRAWINGS

One embodiment of the invention will now be explained with reference to FIGS. 1 to 8 of the drawing, in which:

FIG. 1 is a view of a coding device provided with a stacking magazine;

FIG. 2 is a side view of FIG. 1;

DETAILED DESCRIPTION OF THE PREFERRED EMBODIMENTS

Figure 3:
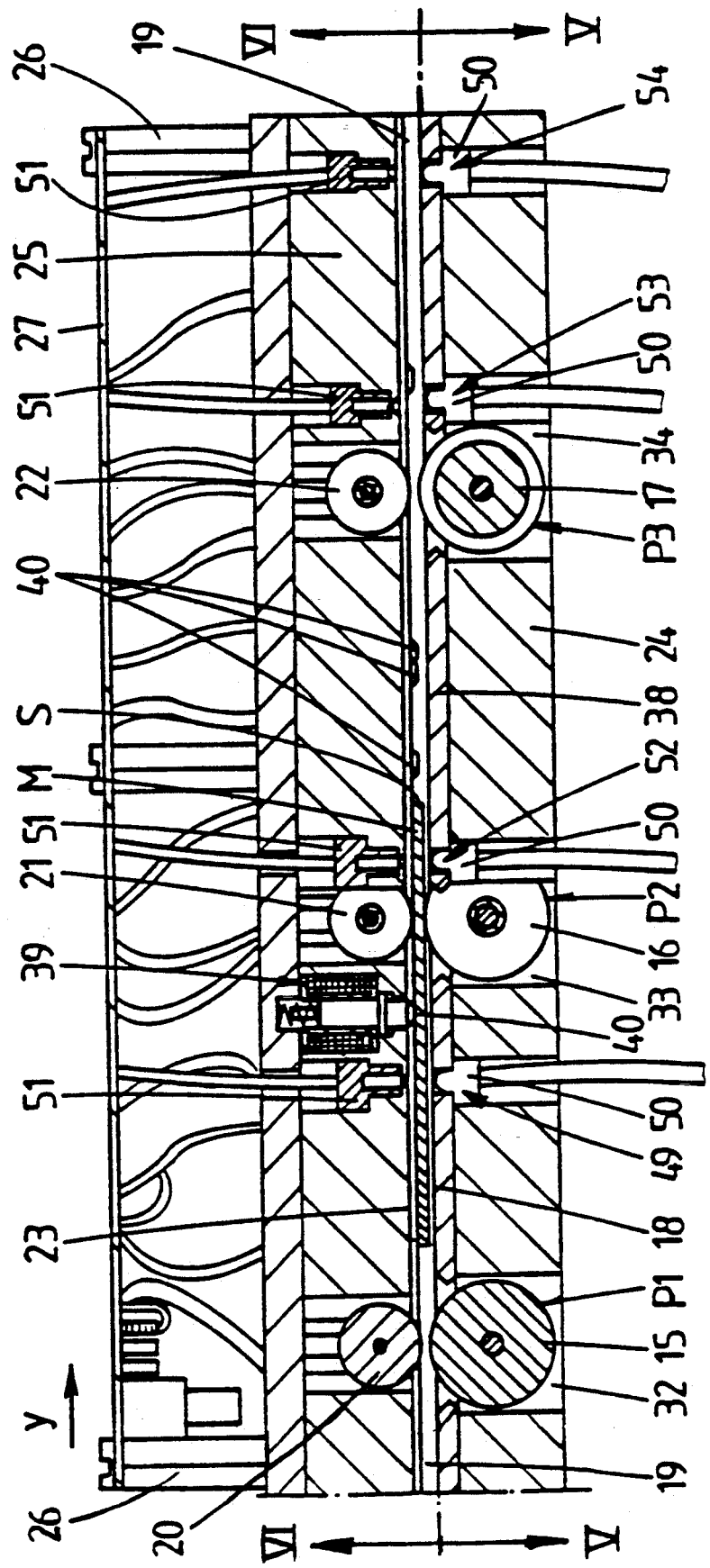
FIG. 3 is a longitudinal section through the essential parts of the coding device.
Figure 4:
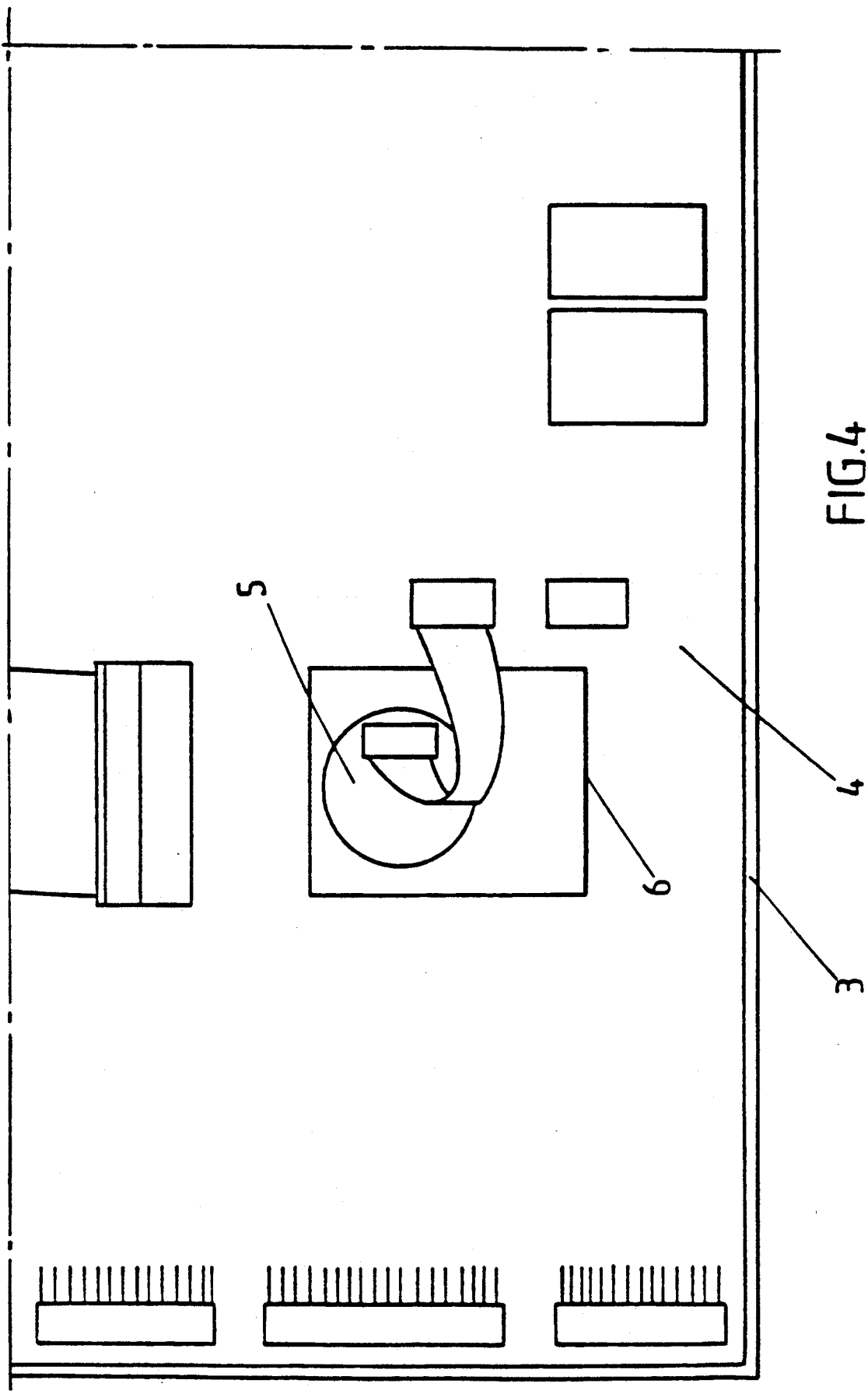
FIG. 4 is a partial view of the coding device, seen from the side opposite the side shown in FIG. 1.
Figure 5:
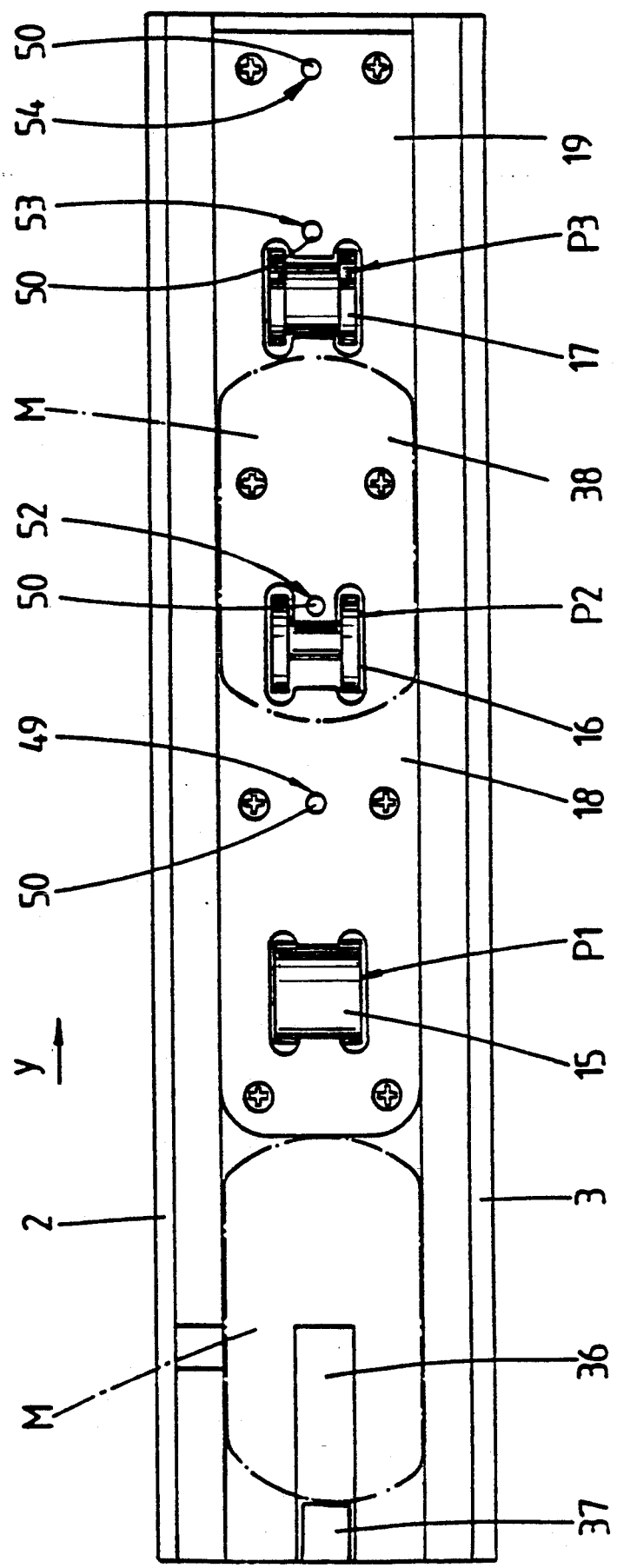
FIG. 5 is the section along the line V—V of FIG. 3.

The coding device, designated generally has 1, has two vertically aligned side plates 2, 3 arranged parallel to and spaced from each other. The one side plate 3 bears a circuitboard 4 containing electronic parts as well as plug connections. This unit can be used in a magnetic card automatic issuing machine, not shown.

Between the side plates 2, 3 there is a cyclic motor (not shown) which cooperates with the electronic system. Its angle measurement transmitter 5 is visible through a window 6 in the switch panel 4. On the motor shaft 7 which passes through the side plate 2 there is seated a toothed belt pulley 8. Around the latter there is placed a toothed belt 9 which drives three pulleys 10, 11, 12 arranged one behind the other at the same height. Tensioning rollers 13, 14 are associated with the sections of the belt between the pulleys 10, 11, 12.

The lower transport rollers 15, 16, 17 of three pairs of transport rollers P1, P2, P3 lying horizontally behind each other are driven from the pulleys 10, 11, 12. The transport rollers 15, 16, 17 extend beyond the lower wide side 18 facing them of a card passage channel 19 which is located between the side plates 2, 3. Opposite the transport rollers 15, 16, 17 there are transport rollers 20, 21, 22 of smaller diameter of the pairs of transport rollers. They also extend beyond the side facing them, namely the upper wide side, of the card passage channel 19. These transport rollers 20 to 22 are not driven. Their shafts are provided in vertical guides.

For the forming of the card passage channel, there is employed a lower rail guide 24 fastened in the upper region between the side plates 2, 3 and a cover rail 25 associated with it. The said cover rail is preferably removable. Above the cover rail 25, a board 27 receiving electronic parts and borne by spacers 26 extends above the cover rail 25 but not over the entire length of the side plates 2, 3. A card stacking magazine 28 is associated with the coding device 1 adjacent to board 27. Said magazine is removable. In order to remove the card stacking magazine 28 and replace it by a new one, a holding device 29 must first of all be brought into a position of release by swinging it in the direction indicated by the arrow X. Magnetic cards M are provided, one above the other, in the card stacking magazine 28 in such a manner that the lower cards lie in the region of the starting end 30 of the channel. In order that the lowermost magnetic card M in each case can be inserted into the card channel 19, the cover rail 25 has an opening 31 at the height of the card stacking magazine 28.

The upper transport rollers 20, 21, 22 extend within the cover rail 25 while the lower transport rollers 15, 16, 17 are arranged within the rail guide 24 in corresponding recesses 32, 33, 34. Furthermore, adjacent pairs of transport rollers, P1, P2, P3 are at a smaller distance from each other than the length of the magnetic card M. Upon its passage, the magnetic card M is therefore conveyed by at least one pair of transport rollers in the card passage direction Y.

An electric motor 35 located between the side plates 2, 3 at the entrance end of the card passage channel 19 actuates a pusher 36 which is moveable forward and backward and the projection 37 of which lying in the longitudinal central plane of the card passage channel 19 moves the lowermost card M of the stack of cards into the card passage channel 19 in such a manner that the first pair of transport rollers P1 then grips the magnetic card M and conveys it further by frictional engagement. In order to obtain frictional engagement, the distance between the individual transport rollers of a pair of transport rollers is less than the thickness of the magnetic card M.

The magnetic card M can comprise a plastic support which serves to receive a magnetizable layer of barium-ferrite which is covered by a foil. The magnetic card can furthermore have a bar code arranged transversely to its direction of passage.

The wide side 18 of the card passage channel 19 is formed by a channel wall 38 consisting of ferromagnetic material, which is part of the rail guide 24.

On the opposite wide side 23 of the card passage channel 19, on the other hand, magnetizing devices 39 are provided. They extend accordingly in the cover rail 25. The magnetizing devices 39 are so arranged that their magnetization pins 40 lie on channel longitudinal tracks arranged at a different distance from the longitudinal edge of the card passage channel 19. Furthermore, the magnetization pins 40 are arranged staggered one behind the other in the track longitudinal direction so that a favorable arrangement of the magnetization devices 39 results. Each magnetization pin 40 has its end surface 41 extending into the card passage channel 19 and is guided for displacement in a channel transverse hole 42. As can be noted, in particular, from FIG. 7, each magnetization pin 40 has a step 43 formed by an annular collar which limits its entrance path into the card passage channel 19 and cooperates with a mating shoulder 44 of the channel transverse hole 42. On the other side of the step 43, the magnetization pin is guided within an exciter coil 45 recessed in the cover rail 25 in order to continue at its end into a pin 46 of smaller cross section. This pin passes through a compression spring 47 which urges the magnetization pin 40 in the direction of the channel, this movement being limited by the step 43 and the mating shoulder 44.

Figure 7:
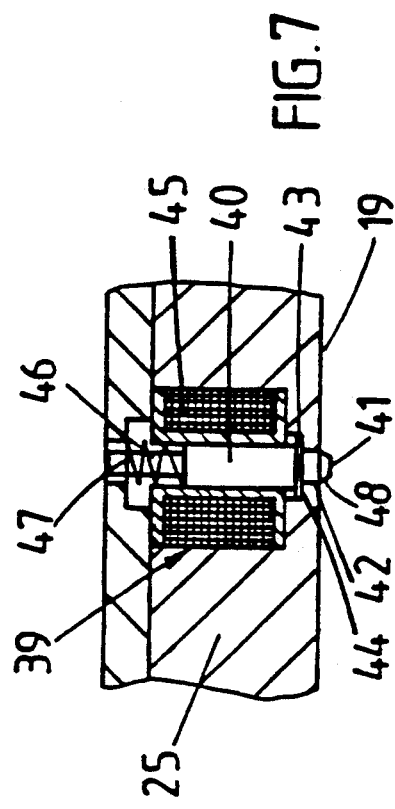
FIG. 7 is an enlarged view of a section in the region of a magnetization device.
Figure 6:
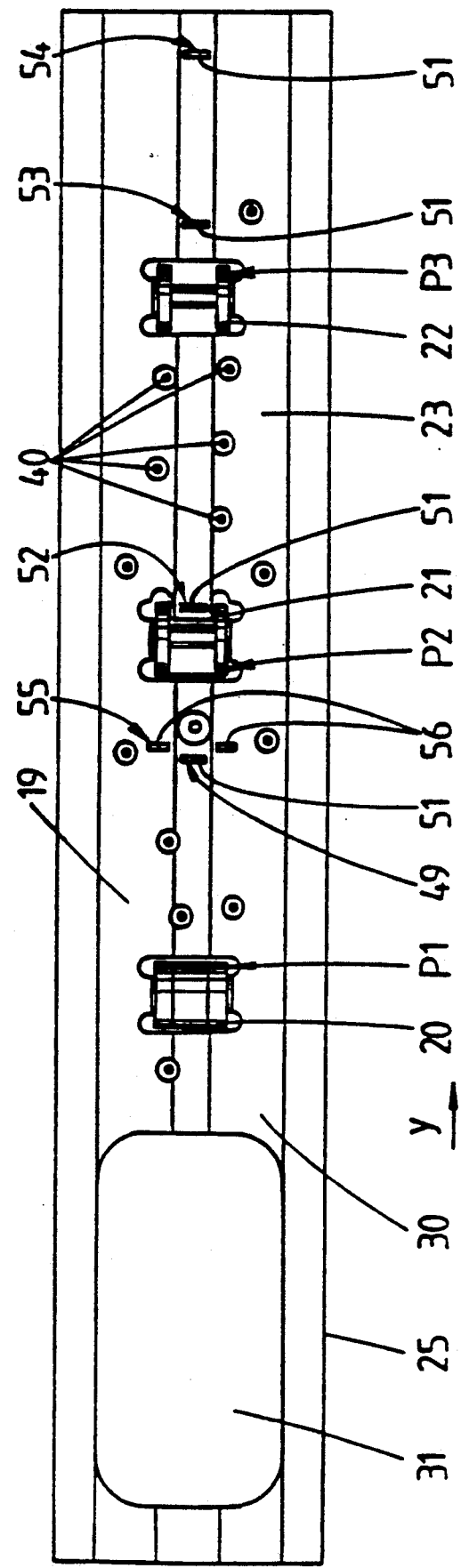
FIG. 6 is a section along the line VI—VI of FIG. 3.

FIGS. 3 and 7 furthermore show that the magnetization pin 40 is provided with a run-on bevel 48 in the shape of a frustoconical surface which is arranged in front of the end surface 41 of the pin. The magnetization pin 40 extends into the channel 19 by the height of this run-on bevel 48.

Between the two pairs of transport rollers P1 and P2 adjacent to the starting region of the channel, there is provided a light barrier 49 which scans the narrow edge S of the magnetic card M. This light barrier is located in the longitudinal center of the card passage channel and consists of a transmitter 50 which is fixed in the rail guide 24 and of a receiver 51 which is arranged in the cover rail 25. Said light barrier 49 extends behind the first pair of transport rollers P1. Additional light barriers 52 and 53 also consisting of transmitter 50 and receiver 51 are arranged behind the other pairs of transport rollers P2, P3. These are the second and third light barriers. As a result of a corresponding cross-sectional shape of the second pair of transport rollers P2, the light barrier 52 can even lie within the dimensions of said pair of transport rollers. The third light barrier 53 extends very closely behind the pair of transport rollers P3, as seen in the card passage direction Y.

The said light barriers 52, 53 serve for resynchronization should the magnetic card M slip upon the transport. The second and third light barriers 52, 53 also effect a scanning of the card narrow edge S so that the instantaneous position of the magnetic card upon its passage is noted. Accordingly, the corresponding magnetization devices receive a flow of current at the proper moment so as to produce the magnetization points or regions on the magnetic card M.

Finally, there is also provided a final light barrier 54 located in the region of the end of the channel, which barrier also consists of a transmitter 50 and a receiver 51. The purpose of this light barrier 54 is to note the pulling of the magnetic card M out of the card passage channel.

Further components of the coding device 1 are a bar-code reader 55 which is associated with the card passage channel and which forms read heads 56 arranged on both sides of the longitudinal center of the channel. In the embodiment shown by way of example, these read heads extend on both sides of the receiver 51 of the first light barrier 49.

Figure 13:
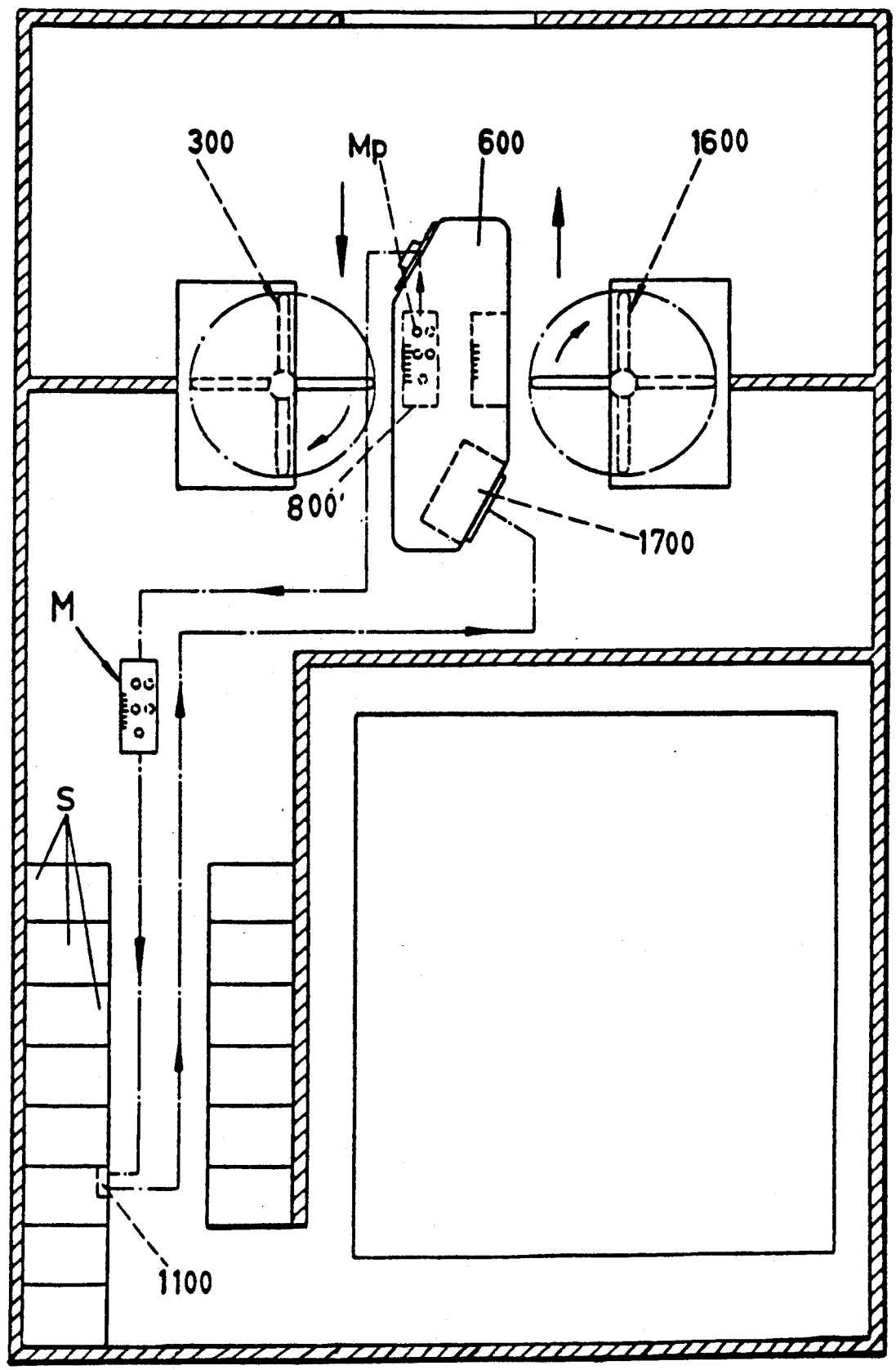
FIG. 13 shows a system using the encoded card.

As shown in FIG. 13, the coding device operates as follows: If the coding device is associated with an entrance control system for a bath house then the visitor must pay a fee at a magnetic card automatic issuing machine (not shown), which can be done, for instance, by the introduction of a coin. In this way, the coding device is turned on so that the electric motor 35 drives the pusher 36, the nose 37 of which moves the lower most magnetic card M of the stack of cards into the region of the first driven pair of transport rollers P1. The magnetic card M which, while it contains a bar code, still does not contain a magnetic code is conveyed further thereby. As soon as the narrow edge S of the card comes into the region of the first light barrier 49, the rotation of the motor is checked by means of the angle of rotation measurement transmitter 5 by the electronic system. This means that the position at that time of the magnetic card within the card passage channel 19 is known. Therefore, the magnetization of the magnetic card can take place at the predetermined place by means of the magnetizing devices 39. Subsequent synchronization can be carried out by the additional light barriers 52, 53 if slippage has occurred during the passage of the card. It is entirely possible that, upon the passage of a card, several magnetization regions are produced on a channel longitudinal track by means of a single magnetization device 39.

During the passage of the magnetic card, the bar code is read by the bar code reader 55 and sent to the central computer, by which an associating of bar code and magnetic code is effected in such a manner that a magnetic code is produced on the magnetic card exclusively for an unused locker. It can, therefore, never happen that two identically coded magnetic cards are issued within one period of use. The magnetic code of the magnetic card produced for the corresponding lock of the locker then serves for the locking of the lock. It should furthermore be mentioned that upon renewed issuance of one and the same magnetic card provided with bar code, a different locker number or cabinet number can be associated with it, together with a corresponding magnetic coding.

After use of the bath house and of the equipment present therein, the magnetic card is introduced into the card insertion slot of an exit barrier so that the magnetic card is then evaluated. In this way, the central computer is provided with the information that the locker which was previously used is now free and can again be assigned.

The bar-code reader 55 is so developed that the magnetic card can pass through the card passage channel 19 in both directions namely both from the stacking magazine and from the delivery slot. In this connection, the transport rollers are driven in corresponding manner. In this way, it is possible to interrogate the data of a card. This can be done only in a special manner of operation of the device, which can be set by an authorized person. If the visitor has, for instance, forgotten what his locker number is, then, with this manner of operation the card can be inserted into the delivery slot of the coding device and the bar code read. By means of a display or print-out, data with regard to the time of use, locker number, etc. can then be read in combination with the central computer.

Figure 8:
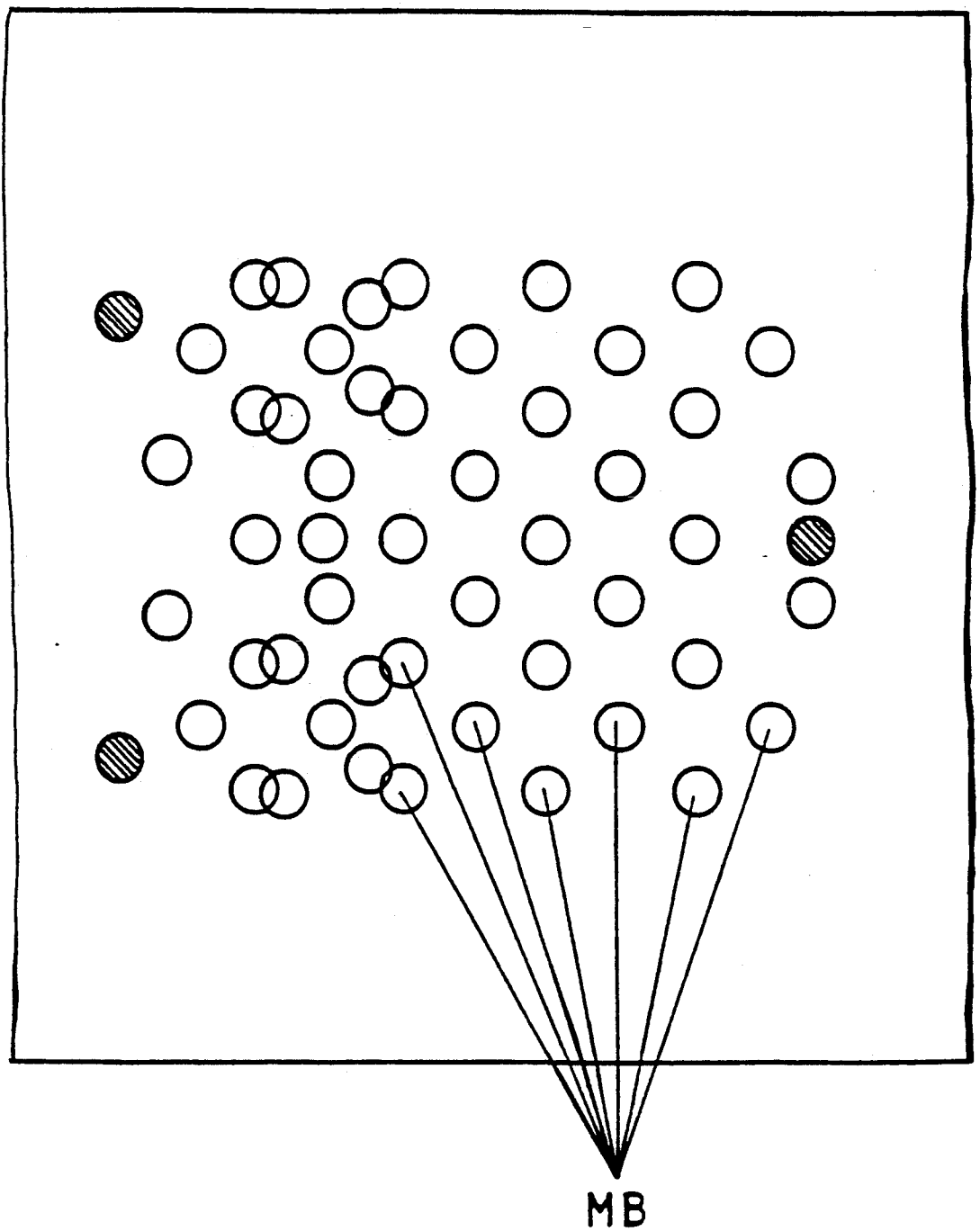
FIG. 8 is a plan view of a magnetization pattern.

The magnetization scheme shown in FIG. 8 shows that a narrow-mesh grid of magnetization regions MB is created, together with a large possibility of variations with respect to the different magnet codings. Only a given number of the magnetization regions MB shown in FIG. 8 are magnetized per card for the card coding.

The coding device of the invention can also be used merely to code magnetic cards for corresponding magnetic locks. Use in an entrance control system thus represents a further possibility of use.

FIG. 13 shows the diagram of an entrance control system: The apparatus 66 issues key cards M; they are magnetized in regions, for instance 30 to 50 regions MP. After coded delivery the entrance barrier 300 opens. The user goes to the locker S or the like, the lock 1100 of which with its magnetic pins incorporates a locking code which corresponds to the code which is magnetized on a part of the regions MP. The regions magnetized as a supplementary code are not acted on by the magnetic pins of the lock 1100. The supplementary code is evaluated in the exit barrier 1700 either alone or mixed with the locking code, for identification of the key card and/or to detect additional calculations covering services used in a swimming pool or the like.

The interrogating and manner of action of the key card M in the lock takes place in known manner (see, for instance, the older EP-OS 87 11 852.4) and is merely briefly described here with reference FIGS. 9 to 12.

Figure 9:
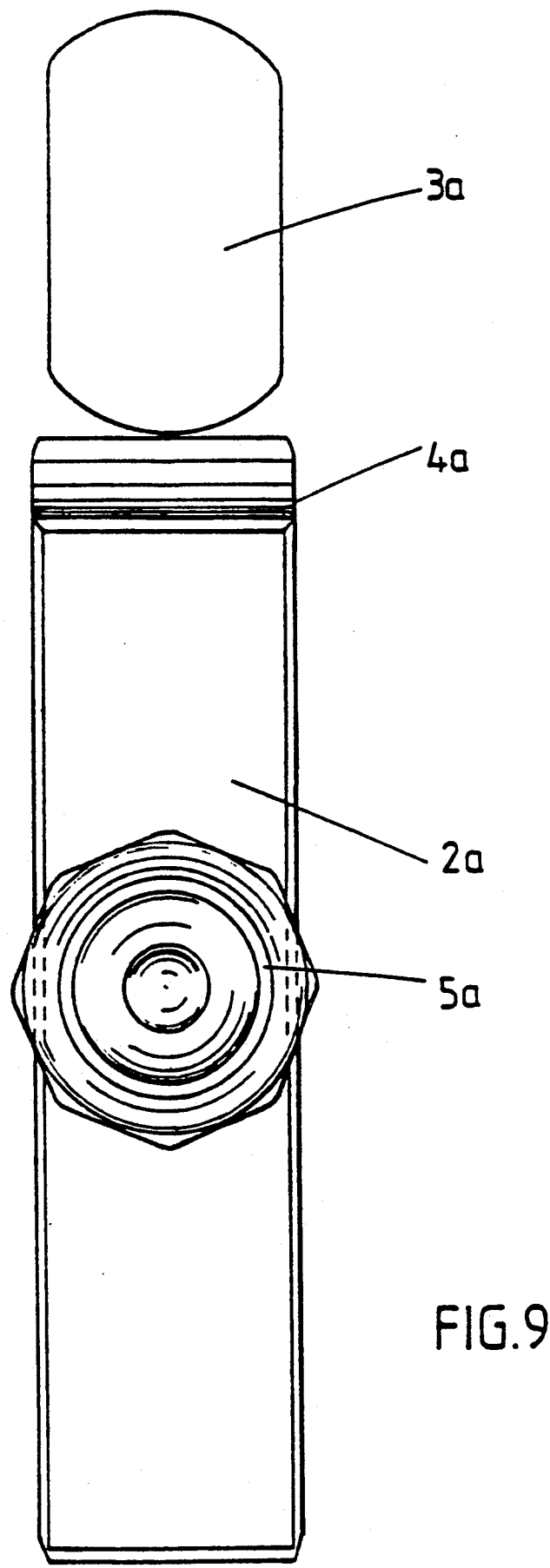
FIG. 9 is a top view of a locking device consisting of lock and key card.

The locking device of FIG. 9 consists of a lock 2a and at least one key card 3a. The housing of the lock 2a is provided with an insertion shaft 4a into which the key card 3a is introduced in order to release the lock mechanism. If the key card 3a bears a valid code, then a bolt-actuating shaft is coupled with an actuating knob 5a so that the bolt can be displaced.

Such locks 2a are operated with a plurality of key cards 3a, the individual key cards 3a being issued in each case to persons whose entrance is authorized, so that only such persons have access to a controlled region or the like which is closed off by the lock 2a. In this connection, the lock 2a is provided in the region of its insertion shaft 4a with a card reader 6a which detects at least a part of the key card code 7a, as a result of which, in addition to checking the lock justification, there is the possibility of transmitting key-card data into a memory 7a' of a lock electronic system 8a. Within the memory 7a' special information with regard to the key number, the installation number, the date and the time of locking, the carrying out of a locking process (whether the key card was merely inserted or whether the lock mechanism was also moved) and values with regard to whether malfunctions occurred are then stored in the memory 7a'. The storing of a desired number of previously effected lockings is possible, as a result of which the content of the memory is constantly updated in the manner that the oldest data is written over by the latest data.

In order to obtain access to the stored data, a connection must be created between the lock 2a and a corresponding logging device. This logging device is preferably developed as a portable printer. By means of a coupling element which is inserted into the insertion shaft 4a of the lock 2a, a data transmission path can be created between the lock electronics 8a and the inserted printer so that the desired information can be listed by the printer.

Figure 10:
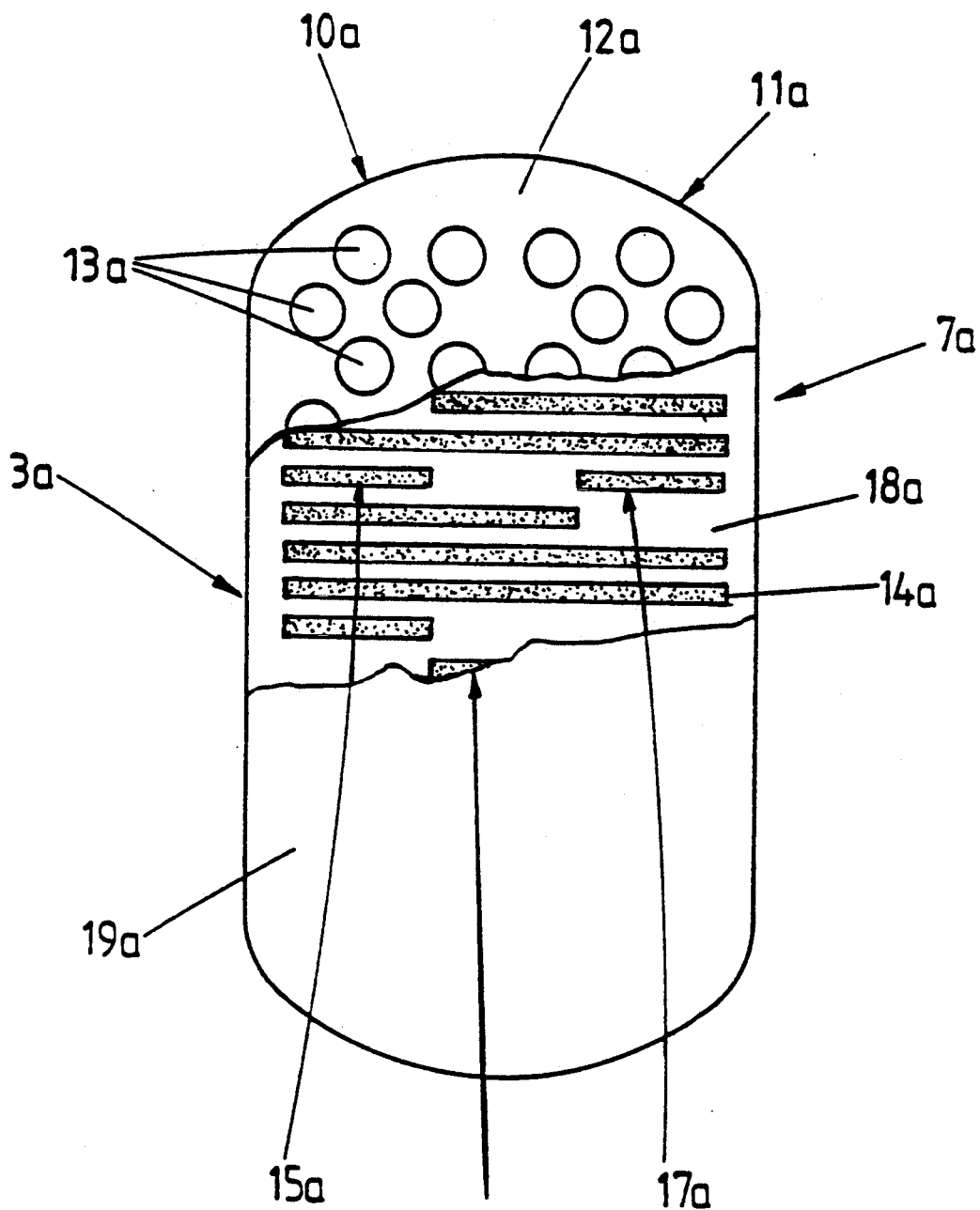
FIG. 10 shows a key card partially broken away.

FIG. 10 shows, broken away, the construction of the key card 3a, which consists essentially of two parts. The one part is the support material 10a of the key card 3a which consists preferably of a suitable plastic. The second part is formed of a coding substrate 11a which is applied onto the support material and permits the individualizing of the key card 3a.

Over the card-shaped support material 10a consisting of plastic of the key card 3a, there is applied a coating of barium-ferrite 12a which is magnetized by means of a device not shown in the drawing, so that magnetic regions 13a provided with north and south poles can be formed. These magnetized regions 13a have permanent magnetism and form a part of the key-card code 7a. Over the barium-ferrite coating 12a there is arranged a bar code 14a as supplementary code, it consisting preferably of three tracks 15a, 16a and 17a which extend parallel to each other. The bar code 14a has uniformly wide bars which, seen in the lengthwise direction of the track are at equal distance from each other insofar as empty spaces 18a are not formed between them.

Instead of the bar code, such regions MP of the key card can also by magnetization incorporate the supplementary codes which are not used for the locking code of the lock 1100.

Figure 11:
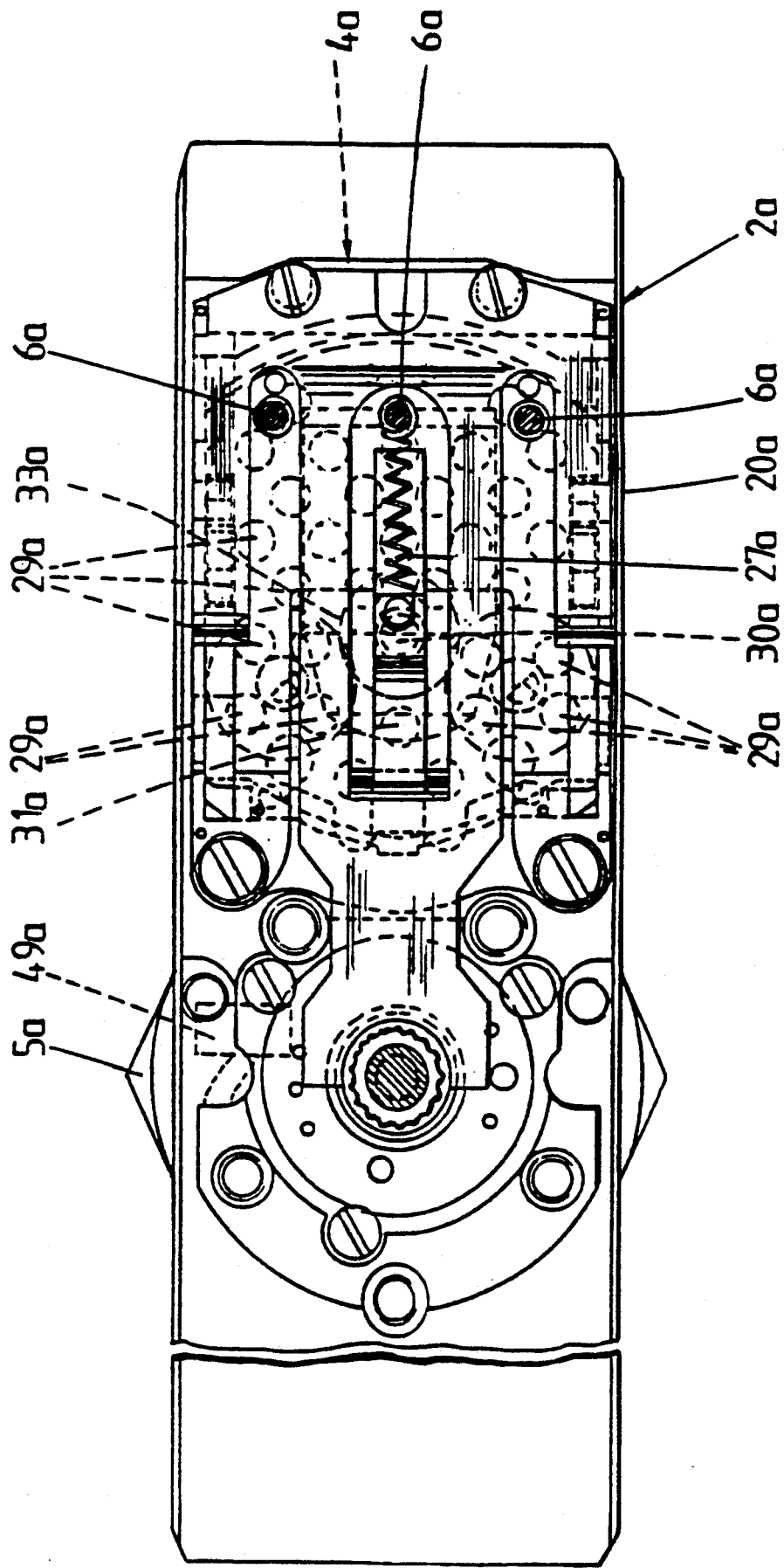
FIG. 11 is a rear view of the lock with the coupling element not inserted.
Figure 12:
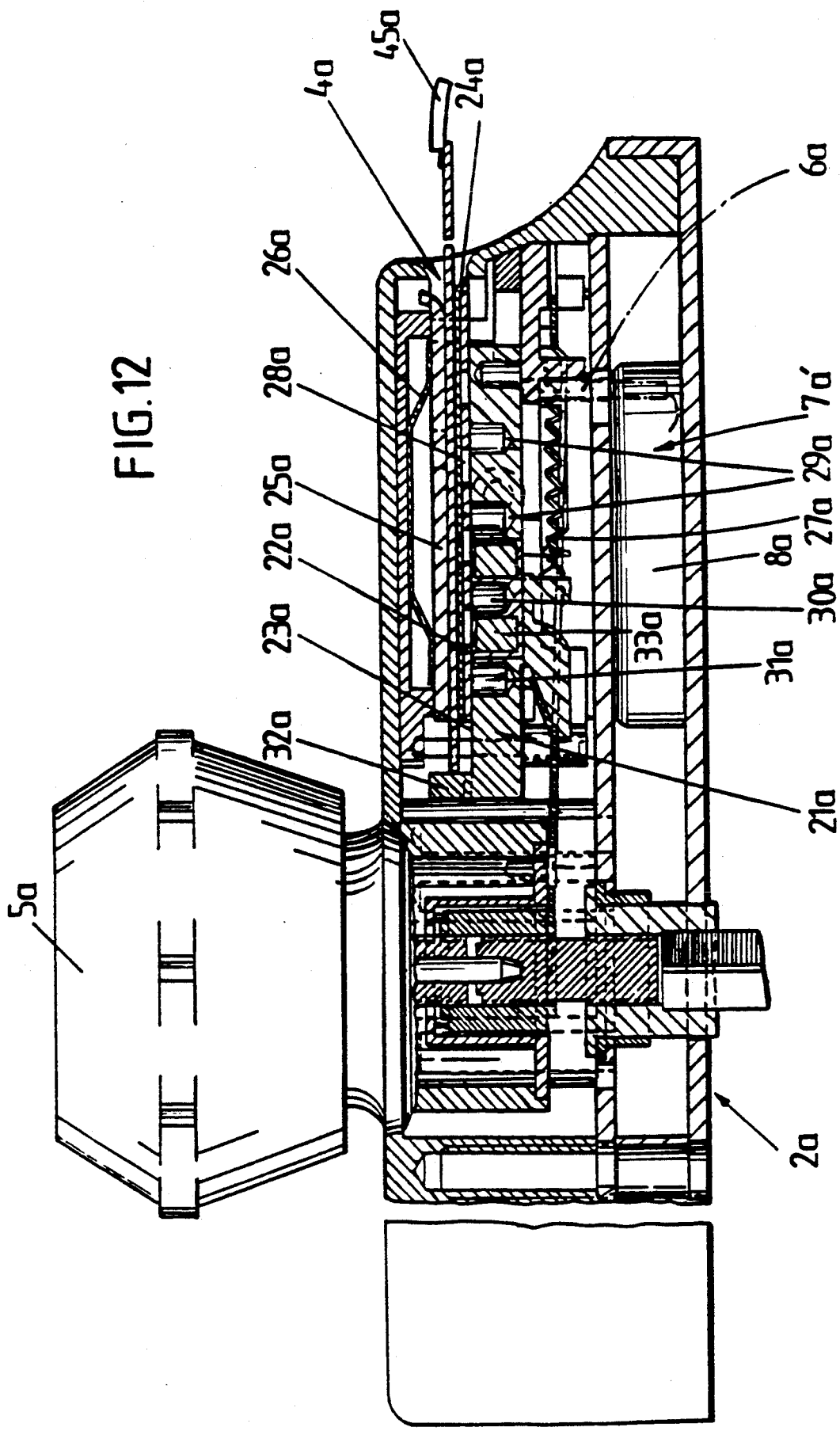
FIG. 12 is a side view of the showing of FIG. 11, but with the coupling element inserted.

FIGS. 11 and 12 show essential components of the construction of the lock. The lock 2a has a lock housing 20a within which a pusher 21a is longitudinally displaceable, its slide surface 23a lying on a perforated plate 22a which is fastened to the lock housing. The other side of the perforated plate 22a is covered by a cover plate 24a which forms the one wall of the insertion shaft 4a. The second wall of the insertion shaft 4a is formed by an armature plate 25a of ferromagnetic material which is pressed by a spring 26a against the cover plate 24a. The pusher 21a is held in basic position (position shown in FIG. 11) by a coil tension spring 27a. In this basic position, mounting cut-outs 29a lie aligned with the holes 28a of the perforated plate 22, tumblers 31a developed as magnetic pins 30 are longitudinally displaceable in said cutouts 29a. At the lower end of the insertion shaft 4a, the pusher 21a has a projection 32a against which the central region of a key card 3a inserted into the insertion shaft 4a or of an inserted coupling element can come. At least one of the mounting cutouts 29a of the pusher 22a is surrounded by a magnetic coil 33a. The magnetic coil 33a is connected to the lock electronics 8a. Furthermore the card reader 6a extends up into the region of the insertion shaft 4a and is also connected by a cable connection to the lock electronics 8a.

If a key card 3a or a coupling element (for the printer interrogation) bearing a valid key card code is now inserted into the insertion shaft 4a of the lock 2a than the lower edge of the card first comes against the projection 32a of the pusher 21a. In this position, the locking-code-magnetized regions 13a of the key card 3a or of the coupling element come opposite the magnetic pins 30a which were previously attracted by the armature plate 25a and accordingly rest in the holes 28 of the perforated plate 22a by one partial region and in the mounting recesses 29a of the pusher 21a by another partial region. This locking of the pusher is released in the manner that the magnetized regions 13a come with identical poles against the magnetic pins 30a so that the latter are pushed completely into the mounting holes 29a and accordingly release the holes 28a of the perforated plate 22a.

The magnetic pin 30a surrounded by the magnetic coil 33a is not moved into position of release by a magnetized region 30a but rather displaced due to an excitation of the magnetic coil 33a. This takes place in the manner that the card reader 6a reads the bar code 14a—or at least a part thereof—and compares the information read with information in the memory 7a' of the lock electronic system 8a. If agreement exists, then the magnetic coil 33 is energized and the corresponding tumbler 31a is shifted. As a whole, the pusher 21a is thus released and, by further inward pushing of the key card 3a or of the coupling element, can be brought into the position shown in FIG. 12 in which—in the case of a key card 3a—a displacement of the bolt of the lock 2a by actuation of the actuating knob 5a is possible via a mechanism which is not further described here.

If the supplementary code is not formed by a bar code but by a magnetization of such regions MP as have not been used for the locking code, which results in the advantage of a uniform coding technique, then this code is read by the corresponding reading device.

What is claimed is:

1. An entrance control system, said control system being operative with a coding device for coding magnetic cards;

wherein said coding device comprises a card passage channel having a cover rail with a transverse hole opening into the channel;

at least one magnetizing means which contacts a surface of a card to be magnetized, said magnetizing means having a magnetizing pin arranged on a wide side of said card passage channel and having an end surface on its end facing said card passage channel, said magnetizing means further comprising a magnetizing coil surrounding the magnetizing pin and an electric control device for activating the magnetizing coil;

a spring urging said magnetizing pin through said hole into said channel;

wherein the end surface of said magnetizing pin extends into said card passage channel and the magnetizing pin is arranged for longitudinal displacement under a force of said spring in said transverse hole in a direction into said card passage channel;

additional ones of said magnetizing means, all of said magnetizing means being so arranged that their respective magnetizing pins are at different distances from a longitudinal edge of said card passage channel;

a plurality of said magnetizing means are positioned for magnetizing one of a plurality of regions of said magnetic card, said magnetic card being suitable for use as a key card for activating a lock which regulates operation of an exit barrier;

said control device includes a reading device for reading data in said card;

one of said plurality of regions of said card serves to activate said lock;

further ones of said plurality of regions are magnetized with identifying supplementary code, said further regions being free of participation in a closing of the lock; and said one region of said card for activation of the lock of the exit barrier is detected by said reading device for evaluation of a locking-code magnetization; and wherein said entrance control system comprises a plurality of locker locks located in an entrance control region and being operable by corresponding magnetic codes of respective ones of a plurality of magnetic cards including said first-mentioned magnetic card;

an entrance barrier, and a magnetic-card automatic issuing machine which opens said entrance barrier upon issuance of a card and by the card subsequently to issuance;

an exit barrier, a card stacking machine, and a central computer;

wherein said magnetic card automatic issuing machine upon entrance issues to a user, from said card stacking machine, a magnetic card which is coded during the issuing process with a magnetic code of a free locker and has a supplementary code to be detected by said reading device during an issuing process; and said reading device is operative with said central computer for reading of both bar-code data and magnetic-code data, and said exit barrier has a card insertion slot for the evaluation of a supplementary code of a returned magnetic card.

2. An entrance control system according to claim 1, further comprising a magnetic-code erasing device which erases a magnetic code of a returned magnetic card prior to an insertion of the returned magnetic card to a card stack of said stacking machine.

* * * * *